United States Patent
Yamane et al.

(10) Patent No.: US 9,302,333 B2
(45) Date of Patent: Apr. 5, 2016

(54) END PORTION PROCESSING APPARATUS

(75) Inventors: Shigemi Yamane, Tokyo (JP); Mikio Nakamura, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 490 days.

(21) Appl. No.: 13/823,961

(22) PCT Filed: Dec. 27, 2011

(86) PCT No.: PCT/JP2011/080168
§ 371 (c)(1),
(2), (4) Date: Mar. 15, 2013

(87) PCT Pub. No.: WO2012/093617
PCT Pub. Date: Jul. 12, 2012

(65) Prior Publication Data
US 2013/0202378 A1 Aug. 8, 2013

(30) Foreign Application Priority Data

Jan. 5, 2011 (JP) .................................. 2011-000792

(51) Int. Cl.
*B23C 3/12* (2006.01)
*B23C 1/16* (2006.01)
(Continued)

(52) U.S. Cl.
CPC ...... *B23C 1/16* (2013.01); *B23C 3/12* (2013.01); *B23Q 35/06* (2013.01); *B23Q 35/105* (2013.01); *Y10T 409/302576* (2015.01)

(58) Field of Classification Search
CPC .. B23Q 9/0071; B23Q 9/0064; B23Q 9/0007; B23Q 35/04; B23Q 35/06; B23Q 35/105; B23Q 35/101; B23Q 35/48; B23C 1/16; B23C 1/20; B23C 3/12; B23C 3/126; B23C 2215/04; B23C 2220/40; B23C 2226/27

USPC .................. 409/138, 175, 178, 107, 109, 124
IPC ..................................... B23Q 35/48; B23C 3/12
See application file for complete search history.

(56) References Cited

U.S. PATENT DOCUMENTS

| 1,853,554 | A | * | 4/1932 | Dennis | ..................... B27D 1/10 144/114.1 |
| 2,037,635 | A | * | 4/1936 | Knowles | ................ B23Q 1/621 409/94 |

(Continued)

FOREIGN PATENT DOCUMENTS

| CN | 2301282 | 12/1998 |
| DE | 2915312 A1 * | 10/1980 |

(Continued)

OTHER PUBLICATIONS

Machine translation of DE 2915312, printed Aug. 2015.*
(Continued)

*Primary Examiner* — Daniel Howell
(74) *Attorney, Agent, or Firm* — Wenderoth, Lind & Ponack, L.L.P.

(57) ABSTRACT

The end portion processing apparatus includes an X-direction driving unit which allows a back-and-forth movement along an X-direction; a cutter supporting member which is supported by the X-direction driving unit, is able to run in a Y-direction, and supports a cutter member extending in a Z-direction which is perpendicular to the XY-plane; a guide member which has a shape matching to a processing planned shape when seeing from the Z-direction, and guides the cutter supporting member such that the cutter member moves to follow the processing planned shape; and a Y-direction position changing mechanism which changes the position in the Y-direction of the cutter supporting member to the work material. The Y-direction position changing mechanism changes the position of the cutter supporting member such that the cutter supporting member runs on further inner side in case of going back than in case of going forth.

14 Claims, 14 Drawing Sheets

(51) Int. Cl.
*B23Q 35/06* (2006.01)
*B23Q 35/10* (2006.01)

(56) References Cited

U.S. PATENT DOCUMENTS

| | | | | |
|---|---|---|---|---|
| 2,664,122 | A | * 12/1953 | Allen, Sr. | B23Q 35/106 144/144.1 |
| 2,825,270 | A | * 3/1958 | Kalbow | B23Q 35/26 409/107 |
| 3,785,246 | A | * 1/1974 | Ohno | B26D 1/04 144/117.3 |
| 3,865,162 | A | * 2/1975 | Schmidt | B23Q 35/105 144/134.1 |
| 3,910,159 | A | * 10/1975 | Gladwin | B23C 3/13 409/118 |
| 4,061,077 | A | 12/1977 | Gladwin | |
| 4,601,619 | A | * 7/1986 | Stinnett | B23Q 1/5468 409/178 |
| 4,836,722 | A | * 6/1989 | Kurita | B23Q 1/34 409/100 |
| 5,562,136 | A | * 10/1996 | Blackshear | B23Q 9/0071 144/134.1 |
| 5,649,888 | A | * 7/1997 | Micale | B23P 21/00 409/131 |
| 5,967,715 | A | * 10/1999 | Porper | B44B 3/001 409/109 |
| 2008/0159819 | A1 | * 7/2008 | Bui | B23C 3/12 407/42 |

FOREIGN PATENT DOCUMENTS

| | | |
|---|---|---|
| DE | 3710140 A1 * | 10/1988 |
| JP | 53-85762 | 7/1978 |
| JP | 7-33603 | 6/1995 |
| JP | 08-323524 A * | 12/1996 |
| JP | 2002370116 A * | 12/2002 |
| JP | 2007-15028 | 1/2007 |
| JP | 2007-265237 | 10/2007 |
| JP | 2010-94800 | 4/2010 |
| JP | 2010-194749 | 9/2010 |
| WO | 2010/095536 | 8/2010 |
| WO | 2010/109929 | 9/2010 |

OTHER PUBLICATIONS

International Preliminary Report on Patentability and Written Opinion of the International Searching Authority issued Jul. 10, 2013 in International (PCT) Application No. PCT/JP2011/080168.
Chinese Office Action issued Jul. 3, 2014 in corresponding Chinese Patent Application No. 201180049979.6 with partial English translation.
International Search Report issued Feb. 7, 2012 in International (PCT) Application No. PCT/JP2011/080168.
Japanese Notice of Allowance issued Mar. 3, 2015 in corresponding Japanese Patent Application No. 2011-000792 with partial English translation.
Canadian Notice of Allowance issued Nov. 12, 2014 in corresponding Canadian Application No. 2,812,994.
Chinese Notice of Allowance issued Mar. 2, 2015 in corresponding Chinese Patent Application No. 201180049979.6 with partial English translation.

* cited by examiner

END PORTION PROCESSING APPARATUS

TECHNOLOGY FIELD

The present invention relates to an end portion processing apparatus.

BACKGROUND ART

A technique of processing an end portion of a work material to a desired shape is known. For example, as shown in FIG. 1, in the process of the manufacture of a main wing panel of an aircraft, a plurality of conveyance hang tabs 101 are prepared for the end portion of the main wing panel 100. When the main wing panel 100 is conveyed, the main wing panel 100 is suspended by use of the plurality of hang tabs 101. The hang tabs 101 are finally unnecessary, and are cut and detached from the main wing panel 100. In the cutting, it is required to process the end portion of the main wing panel 100 to be smooth.

In order to process the end portion of the work material to be smooth, a technique of cutting an unnecessary portion and using a sandpaper to polish the end portion is thought of. However, the polishing process takes time and the processing cost increases.

In relation to the above description, a method of processing the end portion of a carbon fiber reinforced plastic laminate board and so on is disclosed in Patent Literature 1 (Japanese Patent Publication (JP 2010-94800A)). In the method of processing the end portion, a principal axis of a processing machine is divided to have many axes and the machine becomes a multi-axis machine. Then, a rough processing tool and a finish processing tool are provided for the multiple axes. The end portion of the carbon fiber reinforced plastic laminate board is processed previously by the rough processing tool, and then the finish processing is carried out by the finish processing tool. Also, a technique that the carbon fiber reinforced plastic laminate board is controlled three-dimensionally in the position by an NC control machine is described in Patent Literature 1.

Citation List

[Patent Literature 1] JP 2010-94800A

SUMMARY OF THE INVENTION

According to Patent Literature 1, the position control of the work material is performed by using the NC control machine. However, when the work material is a large-scaled product such as the main wing panel of the aircraft, it is not practical to change the position of the work material in the processing.

Therefore, the present invention may provide an end portion processing apparatus which can process an end portion of a work material without moving the work material, to have a smooth shape.

The end portion processing apparatus according to the present invention is an end portion processing apparatus which processes an end portion of a work material arranged on the XY-plane. This end portion processing apparatus includes an X-direction driving unit which allows a back-and-forth movement along an X-direction; a cutter supporting member which is driven by said X-direction driving unit, is able to move in a Y-direction, and supports a cutter member extending in a Z-direction which is perpendicular to the XY-plane; a guide member which has a shape matching to a processing planned shape when seeing from the Z-direction, and guides said cutter supporting member such that said cutter member moves to follow the processing planned shape; and a Y-direction position changing mechanism which changes the position in the Y-direction of said cutter supporting member to the work material. The Y-direction position changing mechanism changes the position of said cutter supporting member such that said cutter supporting member runs on further inner side in case of going back than in case of going forth.

According to the present invention, when the X-direction driving unit operates, a cutter supporting member is guided to follow a guide member. As a result, the cutter member moves to match to a processing planned shape. Thus, it is possible to process the end portion of the work material without moving the work material, to have a desired shape.

In addition, a position of the cutter supporting member in a Y-direction is changed so that the cutter member moves in a further inside of the work material in case of going back than in case of going forth, by the Y-direction position changing mechanism. Thus, it is possible to roughly process the end portion of the work material is in case of going forth and perform the finish processing in case of going back. The cutter supporting member is subjected to back-and-forth movement by the X-direction driving unit, and as a result, the end portion of the work material can be processed to have a smooth shape.

According to the present invention, the end portion processing apparatus is provided which can processes the end portion of the work material without moving the work material, to have a smooth shape.

DESCRIPTION OF EMBODIMENTS

Hereinafter, embodiments of the present invention will be described with reference to the attached drawings.

First Embodiment

Figure 1:
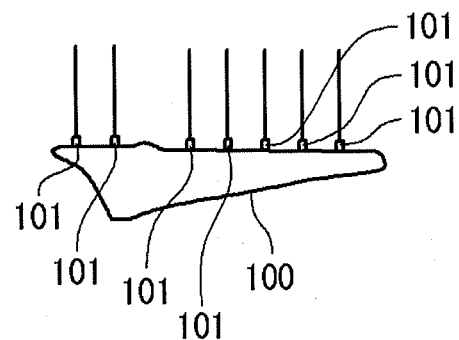
FIG. 1 is a diagram showing a conventional example of a main wing panel.
Figure 2:
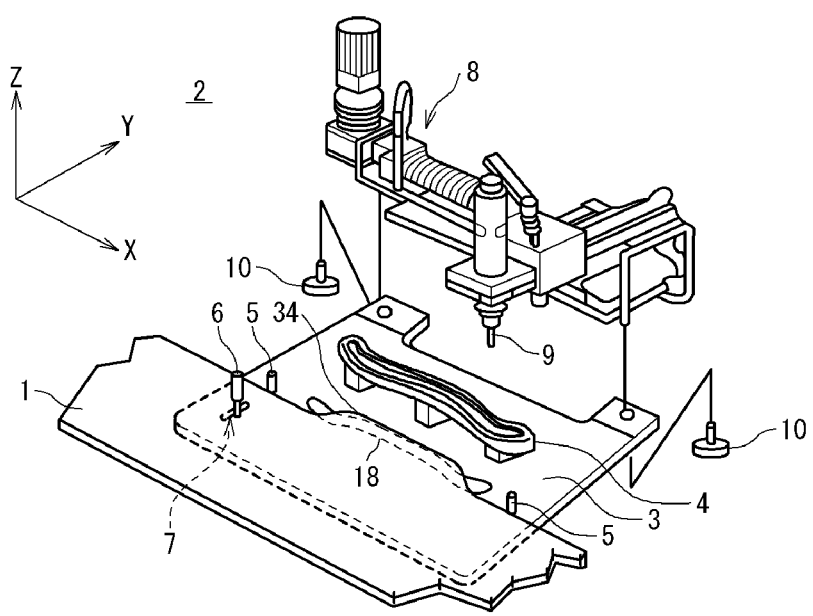
FIG. 2 is a perspective view schematically showing an end portion processing apparatus according to a first embodiment.

FIG. 2 is a perspective view schematically showing an end portion processing apparatus 2 according to a first embodiment of the present invention. The end portion processing apparatus 2 is used to process an end portion of a work material 1.

In the present embodiment, it is supposed that the work material 1 is a main wing panel of an aircraft. Also, it is supposed that the work material 1 is CFRP (carbon fiber reinforced plastic laminate board). The work material 1 has an almost flat plate-like shape and is arranged on an XY-plane. The end portion of the work material 1 extends along an X-direction. A hang tab 34 is provided for the end portion of the work material 1 to protrude into a Y-direction.

In the present embodiment, the end portion processing apparatus 2 is used to cut the hang tab 34. The end portion processing apparatus 2 has a flat plate member 3 and a running unit 8. The plate member 3 is provided to support the running unit 8 and is fixed to the work material 1. The running unit 8 is fixed on the main surface of the plate member 3 by fixation pins 10. The running unit 8 supports an end mill cutter 9 extending to a Z-direction and has a function to move the end mill cutter 9. By moving the end mill cutter 9, the hang tab 34 is cut and the end portion of the work material 1 is processed.

Figure 3:
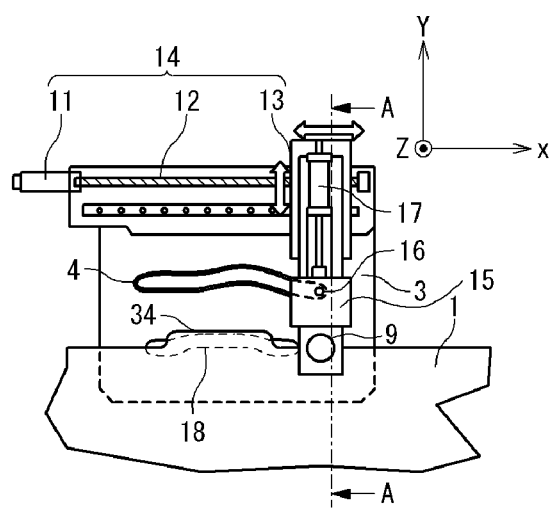
FIG. 3 is a schematic diagram when seeing the end portion processing apparatus from the Z-direction.
Figure 4:
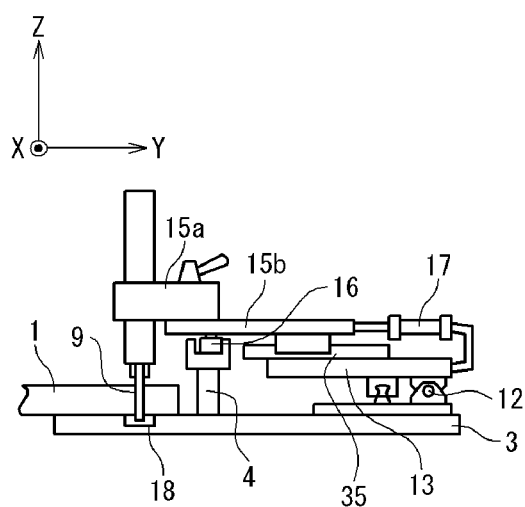
FIG. 4 is a schematic diagram when seeing the end portion processing apparatus from the X-direction.

FIG. 3 is a schematic diagram when seeing the end portion processing apparatus 2 from the Z-direction. Also, FIG. 4 is a schematic diagram when seeing the end portion processing apparatus 2 from the X-direction. Referring to FIG. 2 to FIG. 4, the structure of the end portion processing apparatus 2 will be described in detail.

First, the structure of the plate member 3 will be described.

A part of the plate member 3 is located under the work material 1 to overlap with the work material 1. The plate member 3 is fixed to the work material 1 by using clamps (not shown) and so on. A guide member 4, a ditch 18, a pair of Y-direction positioning pin members 5 and a X-direction positioning hole 7 are provided on the main surface of the plate member 1. It should be noted that the Y-direction positioning pin member 5 and the X-direction positioning hole 7 are illustrated only in FIG. 2, and in FIG. 3, illustration of them is omitted.

The pair of the Y-direction positioning pin members 5 and the X-direction positioning hole 7 are provided to position the plate member 3.

The X-direction positioning hole 7 is a long hole extending along the Y-direction. A reference hole to position the plate member 3 in the Y-direction is provided for the work material 1. In the positioning, the reference hole is overlapped with the X-direction positioning hole 7 and the X-direction positioning pin member 6 is inserted. Thus, the plate member 3 is positioned in the X-direction with respect to the work material.

On the other hand, the pair of the Y-direction positioning pin members 5 are provided for end portions of the plate member 3 in the X-direction and rises upwardly from the main surface of the plate member 3. By pushing the Y-direction positioning pin member 5 against the end portion of the work material 1, the plate member 3 is positioned in the Y-direction.

If the plate member 3 is fixed to the work material 1 by using the clamps and so on after the plate member 3 is positioned in the X-direction and the Y-direction, it is possible to attach the plate member 3 to a desired position.

The guide member 4 is provided to guide the end mill cutter 9 to follow a processing planned shape. The guide member 4 has a guide ditch which has a shape corresponding to the processing planned shape.

A ditch 18 is provided to prevent the end mill cutter 9 from interfering with the plate member 3. As shown in FIG. 4, the tip portion of the end mill cutter 9 is inserted into the ditch 18 and does not interfere with the plate member 3.

Next, the structure of the running unit 8 will be described in detail. As shown in FIG. 3, the running unit 8 has an X-direction driving unit 14, a cutter supporting member 15 and an air cylinder 17 (the pushing mechanism).

The X-direction driving unit 14 is composed of a motor 11, a running axis member 12 and an X-direction moving member 13. The running axis member 12 extends along the X-direction. The running axis member 12 is connected to the motor 11 and the motor 11 rotates it. The X-direction moving member 13 is attached to the running axis member 12 and moves along the X-direction as the running axis member 12 turns. That is, by rotating the running axis member 12 by the motor 11, it is possible to move the X-direction moving member 13 along the X-direction. As the motor 11, a servo motor is used. The motor 11 drives the X-direction moving member 13 to go back and forth. Also, the motor 11 is connected with a controller (not shown). A program for the running speed control is installed in the controller. The running speed of the X-direction moving member 13 is controlled by the program for the running speed control and is controlled according to the running position of the X-direction moving member 13.

Also, as shown in FIG. 4, a rail member 35 extending along the Y-direction is attached to the X-direction moving member 13.

The cutter supporting member 15 is provided to support the end mill cutter 9. As shown in FIG. 4, the cutter supporting member 15 is arranged on a rail member 35 and is supported by the X-direction moving member 13 through the rail member 35. The cutter supporting member 15 is movable into the Y-direction along the rail member 35.

Also, the cutter supporting member 15 has a roller member 16. The roller member 16 is inserted in the guide ditch provided for the guide member 4. The roller member 16 is installed to be able to roll in the guide ditch. When the X-direction moving member 13 moves along the X-direction, the roller member 16 rolls in the guide ditch. As a result, the cutter supporting member 15 is guided by the guide ditch and the end mill cutter 9 moves to match to the processing planned shape. Thus, the end portion of the work material 1 is processed.

Figure 5:
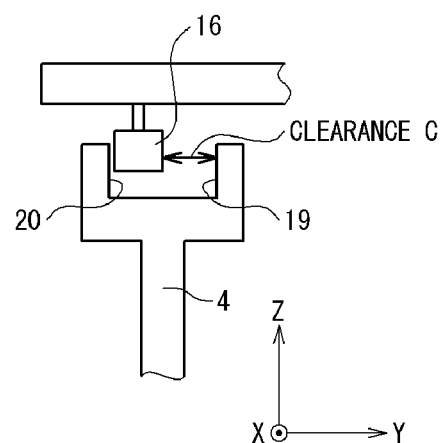
FIG. 5 is an expanded view showing a roller member.

Here, in the present embodiment, the structure of the roller member 16 is devised. FIG. 5 is a diagram showing by magnifying the roller member 16. The diameter of the roller member 16 in the Y-direction is smaller than the width of the guide ditch as shown in FIG. 5, and a clearance c is generated between the roller member 16 and the side wall of the guide ditch.

An air cylinder 17 is provided to change the position of the cutter supporting member 15 to the work material 1 in the Y-direction. As shown in FIG. 4, the air cylinder 17 is connected to the X-direction moving member 13 at one end and is connected to the cutter supporting member 15 at the other end. The air cylinder 17 applies a force in the Y-direction to the cutter supporting member 15.

Next, a method of operating the end portion processing apparatus 2 according to the present embodiment will be described.

First, the plate member 3 is positioned by using the Y-direction positioning pin member 5 and the X-direction positioning hole 7. After the positioning, the plate member 3 is fixed on the work material 1 by using clamps and so on. Next, the running unit 8 is fixes on the plate member 3.

Next, the X-direction driving unit 14 drives the X-direction moving member 13 to move in the X-direction so as to allow back-and-forth movement along the X-direction.

Figure 6A:
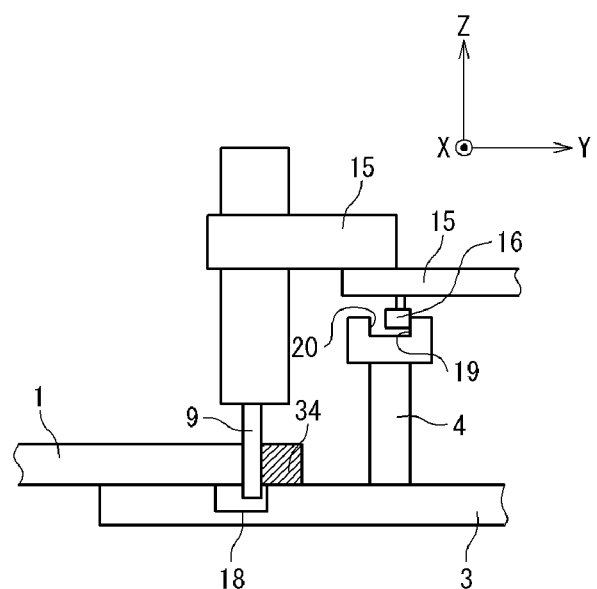
FIG. 6A is a schematic diagram showing a position of the cutter supporting member in case of going forth.

At this time, the air cylinder 17 applies tensile force to the cutter supporting member 15 in case of going forth. FIG. 6A is a schematic diagram showing the position of the cutter supporting member 15 in case of going forth. When the cutter supporting member 15 is pulled to the side of the air cylinder 17 as shown in FIG. 6A, the roller member 16 abuts to one of the side walls of the guide ditch (a first surface 19). As a result, the roller member 16 follows one of the side walls and moves along it. Because the guide ditch has a shape corresponding to the processing planned shape, the end mill cutter 9 supported by the cutter supporting member 15 moves according to the processing planned shape. As a result, the hang tab 34 is cut out from the work material 1.

Figure 6B:
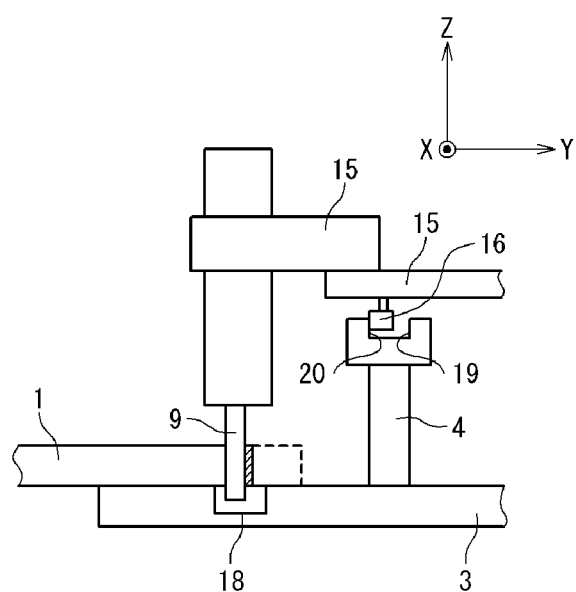
FIG. 6B is a schematic diagram showing the position of the cutter supporting member in case of going back.

On the other hand, the air cylinder 17 applies pushing force to the cutter supporting member 15 to in case of going back. FIG. 6B is a schematic diagram showing the position of the cutter supporting member 15 in in case of going back. When the cutter supporting member 15 is pushed by the air cylinder 17 as shown in FIG. 6B, the roller member 16 abuts to the other side wall (a second surface 20) of the guide ditch. As a result, the roller member 16 follows the other side wall and moves. Therefore, in case of going back, the end mill cutter 9 moves along the inside of the plate member 3 by a clearance c (see FIG. 5) than in case of going forth. Therefore, if the clearance c is set to a suitable value, the end portion of the work material 1 cut in case of going forth can be processed to perform finish processing in case of going back.

As described above, according to the present embodiment, because the guide member 4 is provided, the cutter supporting member 15 can be guided along the processing planned shape. Thus, the end portion of the work material 1 can be processed without moving the work material. Also, it is not necessary to use a large-sized apparatus like an NC processing machine, and the end portion of the work material 1 can be easily processed.

In addition, in the present embodiment, the diameter of the roller member 16 is set smaller than the width of the guide ditch. Thus, the roller member 16 is pushed to one of the side walls in case of going forth by the air cylinder 17 and the roller member 16 is pushed to the other side wall in case of going back. That is, the line which the end mill cutter 9 moves can be easily changed by the air cylinder 17 in case of going back and forth. As a result, both of rough processing and finish processing can be performed only by the X-direction driving unit 14 operating in case of going back-and-forth.

Also, in the present embodiment, the running unit 8 is attached to the plate member 3 detachably. That is, it is possible to separate the guide member 4 and the running unit 8. Many hang tabs 34 are generally provided for the main wing panel of the aircraft. The processing shape sometimes depends on the positions of the hang tabs 34. Even in such a case, if the guide member 4 (the plate member 3) is prepared previously every processing shape, a different portion can be processed by using the identical running unit 8. Also, the cutter supporting member 15 can be easily separated into parts 15a and 15b, so that detachablity of the running unit 8 is improved, and although the board thickness is different from every hang tab 34, movement speed in the X-direction can be set flexibly by a controller (see FIG. 4).

Also, it is desirable that in case of going back, the X-direction driving unit drives the X-direction moving member 13 to move in the X-direction at higher speed than in case of going forth. The end mill cutter 9 cuts the hang tab 34 in case of going forth. Therefore, the resistance which is applied to the end mill cutter 9 in processing becomes large. When the X-direction moving member 13 is moved at high speed in case of going forth, it is easy for the shape of the end portion of the work material 1 to become rough. Therefore, in case of going forth, the X-direction moving member 13 is moved at a lower speed. On the other hand, the resistance which is applied to the end mill cutter 9 in case of going back is smaller than in case of going forth. Therefore, even if the X-direction moving member 13 is moved at high speed, it is possible to obtain a sufficiently smooth shape after the processing. Also, by moving the X-direction moving member 13 at high speed in case of going back, it is possible to reduce processing time of the work material 1.

It should be noted that in the present embodiment, a case that the work material 1 is the main wing panel made from CFRP has been described. However, the work material 1 is not limited to the main wing panel made from CFRP, and the end portion processing apparatus 2 of the present embodiment can be applied to another work material 1. Also, the main wing panel made from CFRP is large-sized and it is required that it has a smooth shape after the processing. From these viewpoints, the end portion processing apparatus 2 according to the present embodiment can be used to suitably process the main wing panel made from CFRP. It should be noted that it is desirable that the clearance c is set to about 0.5 mm when the work material 1 is the main wing panel made from CFRP.

Second Embodiment

Figure 7:
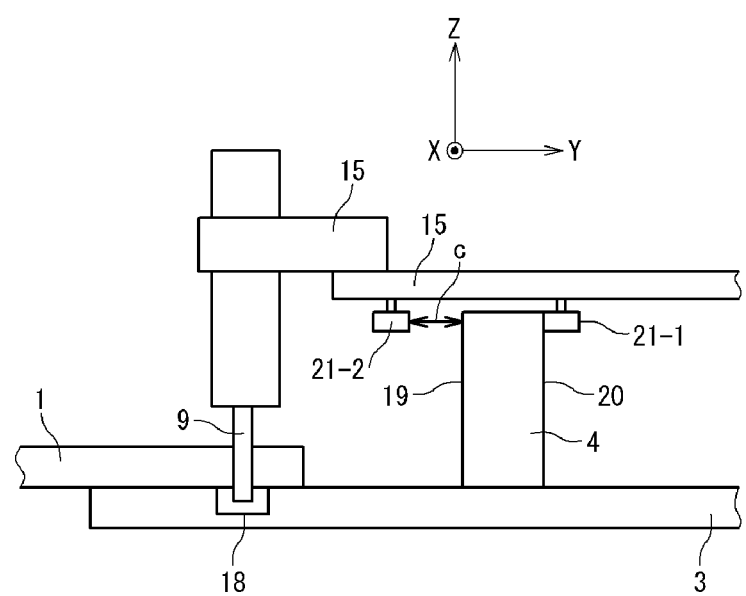
FIG. 7 is a schematic diagram showing the end portion processing apparatus according to a second embodiment.

Next, a second embodiment will be described. FIG. 7 is a schematic diagram showing the end portion processing apparatus 2 according to the present embodiment. In the present embodiment, the structures of the guide member 4 and the cutter supporting member 15 are changed from those of the first embodiment. Because the other structures in the first embodiment can be adopted as they are, a detailed description is omitted.

As shown in FIG. 7, in the present embodiment, the first surface 19 and the second surface 20 are prepared for the guide member 4. The first surface 19 and the second surface 20 turn the directions opposing to each other in the Y-direction. On the other hand, a pair of abutment members 21 (21-1, 21-2) are provided for the cutter supporting member 15. The pair of abutment members 21 are arranged in a position so as to put the guide member 4 between them in the Y-direction. Each of the abutment members 21 is a roller member. Here, a distance between the abutment members 21 (21-1, 21-2) is larger by the clearance c than the distance between the first surface 19 and the second surface 20.

In the present embodiment, like the first embodiment, the air cylinder 17 (not illustrated in FIG. 7) pulls the cutter supporting member 15 in case of going forth. By this, one 21-2 of the abutment members abuts to the first surface 19 of the guide member 4. On the other hand, in case of going back, the air cylinder 17 pushes the cutter supporting member 15. By this, the other abutment member 21-1 abuts to the second surface 20. That is, the position of the end mill cutter 9 can be changed in the Y-direction by the air cylinder 17. Thus, like the first embodiment, it possible to perform rough processing in case of going forth and finish processing in case of going back.

Third Embodiment

Next, a third embodiment will be described. In the above embodiments, relative position relation between the cutter supporting member 15 and the guide member 4 is changed in the Y-direction, and the position of the end mill cutter 9 to the work material 1 is changed in the Y-direction. On the other hand, in the present embodiment, the position of the plate member 3 to the work material 1 is changed in the Y-direction and the position of the end mill cutter 9 is changed in the Y-direction.

Figure 8:
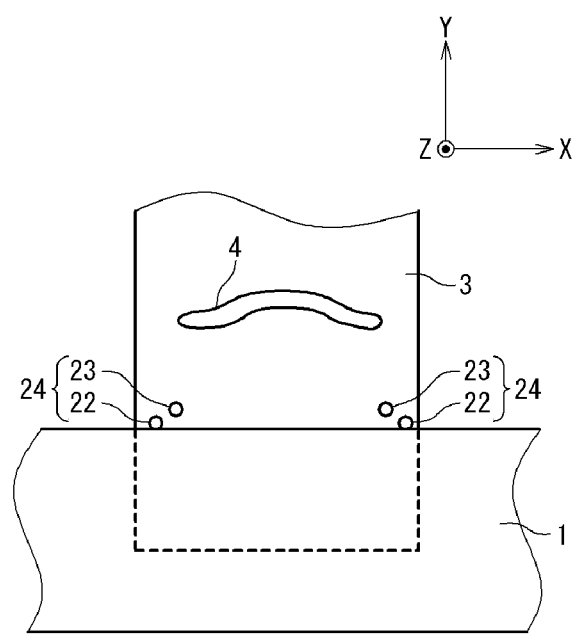
FIG. 8 is a diagram showing the end portion processing apparatus according to a third embodiment.

FIG. 8 is a diagram schematically showing the end portion processing apparatus 2 according to the present embodiment. It should be noted that for convenience of explanation, only a part is illustrated in FIG. 8 to explain the present embodiment, and the illustration of the running unit 8 and so on is omitted. In the following description, a part where there is not any explanation is the same as that of the above embodiments.

As shown in FIG. 8, in the present embodiment, a pin supporting section 24 is provided for the main surface of the plate member 3 in place of the Y-direction pin positioning member 5 (see FIG. 2). The pin supporting section 24 is composed of a pair of first pin supporting sections 22 and a pair of second pin supporting sections 23. The pair of first pin supporting sections 22 and the pair of second pin supporting sections 23 are formed as a concave section and are configured as a support of pin members 25. Here, the pair of the first pin supporting sections 22 and the pair of the second pin supporting sections 23 are provided on different positions in the Y-direction. Specifically, the pair of the second pin supporting sections 23 is provided for the position nearer to the guide member 4 than the pair of the first pin supporting sections 22.

Next, a method of operating the end portion processing apparatus 2 according to the present embodiment will be described.

Figure 9:
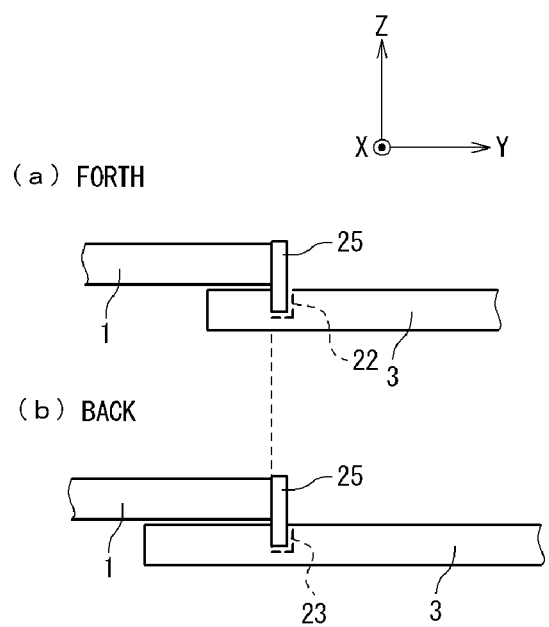
FIG. 9 is a schematic diagram showing a structure of a pin supporting section.

(a) of FIG. 9 is a schematic diagram showing the structure of the pin supporting section 24 in case of going forth. In the present embodiment, when the plate member 3 is positioned, the pin members 25 are installed in the pair of the first pin supporting sections 22. The pin members 25 stand upwardly from the plate member 3. After that, the pin members 25 abut to the end of the work material 1 so that the plate member 3 is positioned in the Y-direction. After the positioning, like the previous embodiments, the plate member 3 is fixed to the work material 1 by using the clamps and so on. Moreover, an operation in case of going forth is executed by the X-direction driving unit 14, to cut the hang tab 34.

(b) of FIG. 9 is a schematic diagram showing the structure of the pin supporting section 24 in case of going back. When the operation in case of going forth ends, the clamps and so on are removed. Then, the pin members 25 are moved to the pair of the second pin supporting sections 23 from the pair of the first pin supporting sections 22. Again, the plate member 3 is positioned so that the pin members 25 abut to the end portion of the work material 1. Moreover, the plate member 3 is fixed by the clamps and so on. As shown by (b) of FIG. 9, the plate member 3 goes under the work material 1 more deeply than in case of gong forth. As a result, the position of the plate member 3 is shifted in an inside direction as a whole in the Y-direction, and the position of the end mill cutter 9 (not illustrated in FIG. 9) is changed into the inside direction. After that, an operation in case of going back is executed by the X-direction driving unit 14. Thus, the finish processing is performed.

In the present embodiment, the pin supporting section 24 functions in case of going forth and in case of going back as a Y-direction position changing mechanism in which the position of the end mill cutter 9 is changed in the Y-direction. As a result, like the previous embodiments, the hang tab 34 is cut in case of going forth and the finish processing is performed in case of going back.

It should be noted that in the present embodiment, the position of the end portion processing apparatus 2 is shifted as a whole in the Y-direction. Therefore, like the previous embodiments, the clearance c does not have to be provided between the cutter supporting member 15 and the guide member 4. Also, it does not always need the air cylinder 17.

Fourth Embodiment

Next, a fourth embodiment will be described. In the present embodiment, the structures of the pin supporting section 24 and the pin member 25 are changed from those of the third embodiment. Because the other components are the same as those of the third embodiment, a detailed description is omitted.

Figure 10A:
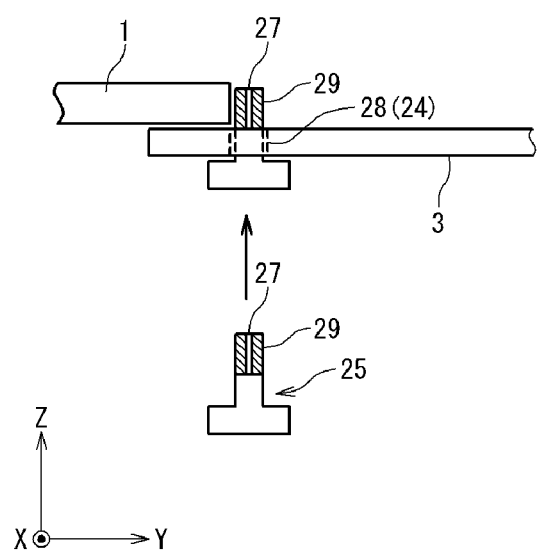
FIG. 10A is a schematic diagram showing the pin supporting section in a fourth embodiment.

FIG. 10A is a schematic diagram showing the pin supporting section 24 of the present embodiment. In the present embodiment, a pair of pin insertion holes 28 are provided for the pin supporting section 24. It should be noted that only one of the pair of pin insertion holes is drawn in FIG. 10A. The pin member 25 is inserted into the pin insertion hole 28. Here, the pin member 25 has an abutment section 27 which penetrates or passes through the pin insertion hole 28 and protrudes on the main surface of the plate member 3. A pipe-shape color (pipe member 29) is attached to this abutment section 27 detachably.

Next, a method of operating the end portion processing apparatus 2 according to the present embodiment will be described.

In the present embodiment, first, when the plate member 3 is positioned in the Y-direction, the pin member 25 with the pipe member 29 attached is inserted in the pin insertion hole 28 (see FIG. 10A). Then, the pin member 25 is pushed to the end of the work material 1 and a position of the plate member 3 in the Y-direction is determined. In this case, the pin member 25 abuts to the work material 1 by the pipe member 29. After that, like the third embodiment, the operation in case of going forth is executed.

Figure 10B:
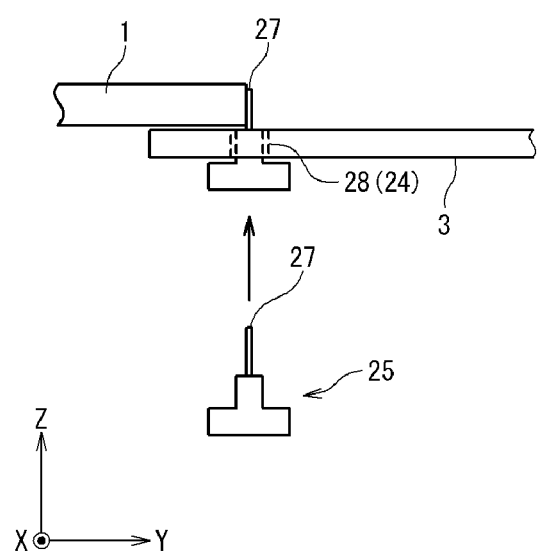
FIG. 10B is a schematic diagram showing the pin supporting section in the fourth embodiment.

On the other hand, when the operation in case of going forth ends, the pin member 25 is removed and the pipe member 29 is removed from the pin member 25. Then, the pin member 25 with pipe member 29 removed as shown in FIG. 10B is again inserted in the pin insertion hole 28. After that, the pin member 25 abuts to the end of the work material 1 again and the plate member 3 is positioned in the Y-direction. In this case, because the pipe member 29 is removed from the pin member 25, the plate member 3 is shifted into the inside direction for the thickness of pipe member 29 in case of going back. That is, the plate member 3 is shifted inside in the Y-direction. As a result, the position of the end mill cutter 9 becomes able to be changed in the Y-direction in case of going forth and in case of going back, like the third embodiment. Like the previous embodiments, the work material 1 is cut in case of going forth, and the finish processing is performed in case of going back.

Fifth Embodiment

Next, a fifth embodiment will be described. In the present embodiment, the structure of the pin member 25 is changed from that of the fourth embodiment. Because the other structures are the same as those of the fourth embodiment, a detailed description is omitted.

Figure 11A:
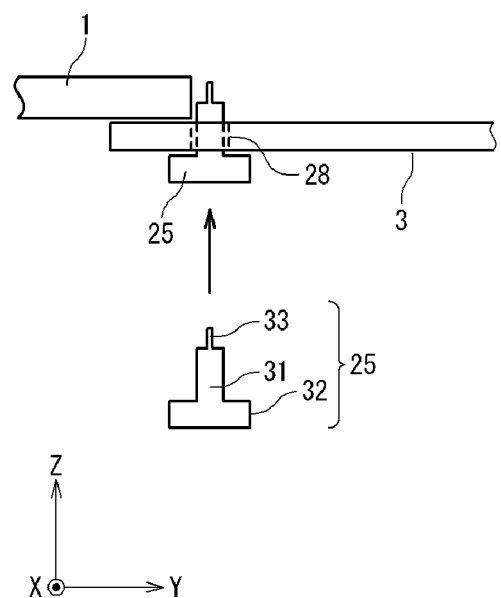
FIG. 11A is a schematic diagram showing a pin member according to a fifth embodiment.

FIG. 11A is a schematic diagram showing the pin member 25 according to the present embodiment. As shown in FIG. 11A, the pin member 25 has a base section 32, a large diameter section 31 and a small diameter section 33. The outer diameter of the base section 32 is larger than the pin insertion hole 28. The large diameter section 31 extends upwardly to protrude from the base section 32 and is formed to have the size possible to be inserted in the pin insertion hole 28. The small diameter section 33 extends upwardly to protrude from the large diameter section 31 and the outer diameter thereof is smaller than the large diameter section 31. Also, the height of the large diameter section 31 is larger than the board thickness of the plate member 3.

Next, a method of operating the end portion processing apparatus 2 according to the present embodiment will be described.

In the present embodiment, first, when the plate member 3 is positioned in the Y-direction, the pin member 25 is inserted in the pin insertion hole 28 (see FIG. 11A). At this time, the pin member 25 inserted so that the base section 32 is brought contact with the back surface of the plate member 3. A part of the large diameter section 31 protrudes from the main surface of the plate member 3. In this condition, the pin member 25 is abutted to the end of the work material 1 to position the plate member 3. At this time, the pin member 25 abuts with the work material 1 at the large diameter section 31. After that, like the fourth embodiment, the operation in case of going forth is executed.

Figure 11B:
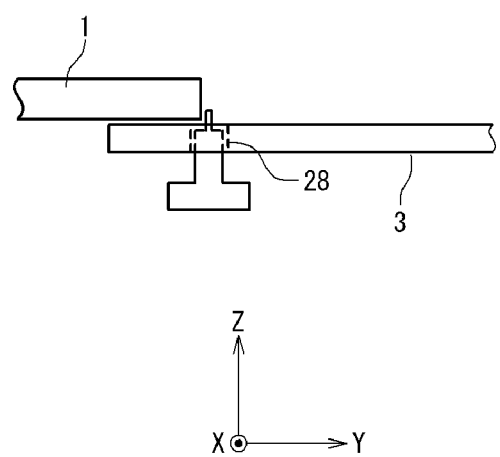
FIG. 11B is a schematic diagram showing the pin member according to the fifth embodiment.

When the operation in case of going forth ends, the insertion depth of the pin member 25 is changed. Specifically, as shown in FIG. 11B, the insertion depth is changed so that the small diameter section 33 protrudes from the main surface of the plate member 3. After that, the pin member 25 is abutted to the end of the work material 1 again to position the plate member 3. In this case, the pin member 25 is brought contact with the work material 1 in the small diameter section 33. Due to a difference between the large diameter section 31 and the small diameter section 33 in the outer diameter, the plate member 3 goes into a portion under the work material 1 deeply. As a result, the position of the end mill cutter 9 can be changed in the Y-direction in case of going forth and in case of going back, like the fourth embodiment. Like the previous embodiments, the work material 1 is cut in case of going forth, and the finish processing is carried out in case of going back.

As described above, the first to fifth embodiments of the present invention have been described. It should be noted that these embodiments are not independent each other and can be combined in a range where there is no contradiction.

This application claims a priority on convention based on Japanese patent application No. JP 2011-000792 filed on Jan. 5, 2011. The disclosure thereof is incorporated herein by reference.

The invention claimed is:

1. An end portion processing apparatus, which processes an end portion shape of a work material, comprising:
    a plate member having an XY-plane, the work material being arranged on the plate member;
    an X-direction driving unit disposed on said plate member to allow a back-and-forth movement along an X-direction;
    a cutter supporting member driven in the X-direction by said X-direction driving unit, being able to move in a Y-direction, and supporting a cutter member extending in a Z-direction which is perpendicular to the XY-plane;
    a guide member disposed on said plate member and having a shape which matches a processing planned shape when seen from the Z-direction, said guide member being disposed on said plate member to guide said cutter supporting member such that said cutter member moves to follow the processing planned shape; and
    a Y-direction position changing mechanism disposed to change the position of said cutter supporting member relative to the work material in the Y-direction such that said cutter supporting member moves on a further inner side of the work material in the Y-direction when said cutter supporting member moves backward in the X-direction than when said cutter supporting member moves forward in the X-direction,
    wherein rough processing is carried out when said cutter supporting member moves forward in the X-direction, and finish processing is carried out when said cutter supporting member moves backward in the X-direction,
    wherein the further inner side of the work material is a finish processing surface of the work material,
    wherein a ditch having a shape corresponding to the processing planned shape is disposed in a surface of said plate member to prevent interference of said cutter member with said plate member,
    wherein said guide member has a first surface and a second surface,
    and wherein said Y-direction position changing mechanism comprises a pushing mechanism disposed to push said cutter supporting member against said first surface when said cutter supporting member moves forward in the X-direction, and to push said cutter supporting member against said second surface when said cutter supporting member moves backward in the X-direction.

2. The end portion processing apparatus according to claim 1, wherein a guide ditch is formed in said guide member, said guide ditch having a shape which matches the processing planned shape,
    wherein said cutter supporting member comprises an insertion member which is inserted in said guide ditch,
    wherein a width of said insertion member in the Y-direction is smaller than a width of said guide ditch, and
    wherein said first surface of said guide member is a first side wall of said guide ditch, and said second surface of said guide member is a second side wall of said guide ditch.

3. The end portion processing apparatus according to claim 2, wherein said insertion member comprises a roller member that rolls in said guide ditch.

4. The end portion processing apparatus according to claim 1, wherein said first surface and said second surface of said guide member are opposite surfaces which face each other in the Y-direction,
    wherein said cutter supporting member comprises a pair of abutment members provided to put said guide member between said abutment members in the Y-direction, and
    a distance between said first surface and said second surface is smaller than a distance between said abutment members.

5. The end portion processing apparatus according to claim 1, wherein said pushing mechanism comprises an air cylinder connected to said X-direction driving unit at one end and connected to said cutter supporting member at the other end.

6. The end portion processing apparatus according to claim 1,
    wherein said plate member is arranged to partially overlap with said work material,
    wherein said cutter supporting member is arranged on a main surface of said plate member, wherein said Y-direction position changing mechanism comprises:

a pin supporting section provided in the main surface of said plate member;

pin members supported detachably by said pin supporting section, extending upwardly from the main surface of said plate member, and abutting with an end of the work material to position said plate member in the Y-direction, wherein said pin supporting section comprises a first pin supporting section and a second pin supporting section which are arranged in different positions in the Y-direction, and wherein said pin members are supported by said first pin supporting section when said cutter supporting member moves forward in the X-direction, and said pin members are supported by said second pin supporting section when said cutter supporting member moves backward in the X-direction.

7. The end portion processing apparatus according to claim 1, wherein said plate member is arranged to partially overlap with the work material, wherein said cutter supporting member is arranged on said plate member, wherein said Y-direction position changing mechanism comprises:

pin insertion holes provided for said plate member; and pin members inserted in said pin insertion holes to protrude from said plate member, and abutting to the end of the work material to position said plate member in the Y-direction, wherein each pin member comprises:

an abutment section which abuts to the end of the work material when said cutter supporting member moves backward in the X-direction; and a circular cylinder member attached to cover said abutment section when said cutter supporting member moves forward in the X-direction.

8. The end portion processing apparatus according to claim 1, wherein said plate member is arranged to partially overlap with said work material, wherein said cutter supporting member is arranged on said plate member, wherein said Y-direction position changing mechanism comprises:

pin insertion holes provided for said plate member; and pin members inserted in said pin insertion holes to protrude from said plate member and abutting to the end of the work material to position said plate member in the Y-direction, wherein each pin member comprises:

a large diameter section; and a small diameter section, wherein each pin member is inserted in a corresponding pin insertion hole to such a depth that said large diameter section abuts to the end of the work material when said cutter supporting member moves forward in the X-direction, and when said cutter supporting member moves backward in the X-direction, each pin member is inserted in said corresponding pin insertion hole to such a depth that said small diameter section abuts to the end of the work material.

9. The end portion processing apparatus according to claim 1, wherein said cutter member comprises an end mill cutter.

10. The end portion processing apparatus according to claim 1, wherein the work material is a main wing of an aircraft.

11. The end portion processing apparatus according to claim 1, wherein the work material is a carbon fiber reinforced plastic laminate material.

12. The end portion processing apparatus according to claim 1, wherein said X-direction driving unit comprises a servo motor.

13. The end portion processing apparatus according to claim 1, wherein said X-direction driving unit and said guide member are separable from each other.

14. The end portion processing apparatus according to claim 1, wherein said X-direction driving unit operates at a higher speed when said cutter supporting member moves backward in the X-direction than when said cutter supporting member moves forward in the X-direction.

* * * * *